United States Patent
Cheikh et al.

(10) Patent No.: US 9,190,866 B2
(45) Date of Patent: Nov. 17, 2015

(54) DEVICE FOR CHARGING A PORTABLE ELEMENT AND ASSOCIATED METHOD

(71) Applicants: CONTINENTAL AUTOMOTIVE FRANCE, Toulouse (FR); CONTINENTAL AUTOMOTIVE GmbH, Hannover (DE)

(72) Inventors: Mohamed Cheikh, Toulouse (FR); Youri Vassilieff, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 188 days.

(21) Appl. No.: 13/940,811

(22) Filed: Jul. 12, 2013

(65) Prior Publication Data

US 2014/0015480 A1  Jan. 16, 2014

(30) Foreign Application Priority Data

Jul. 13, 2012 (FR) ...................... 12 56763

(51) Int. Cl.
- *H02J 7/00* (2006.01)
- *H02J 7/02* (2006.01)
- *H04B 5/00* (2006.01)

(52) U.S. Cl.
CPC .............. *H02J 7/025* (2013.01); *H04B 5/0037* (2013.01); *H04B 5/0075* (2013.01)

(58) Field of Classification Search
CPC ......... H02J 7/025; H02J 5/005; H02J 7/0052; H04B 5/0037; H04B 5/0075; Y02T 90/122

USPC ......................................................... 320/108
See application file for complete search history.

(56) References Cited

U.S. PATENT DOCUMENTS

| | | |
|---|---|---|
| 2006/0202665 A1 | 9/2006 | Hsu |
| 2007/0182367 A1* | 8/2007 | Partovi .......................... 320/108 |
| 2008/0005891 A1* | 1/2008 | Yuasa et al. ................ 29/603.07 |
| 2011/0241435 A1 | 10/2011 | Saito |
| 2012/0038220 A1 | 2/2012 | Kim et al. |
| 2012/0139358 A1 | 6/2012 | Teggatz et al. |

OTHER PUBLICATIONS

French Search Report, dated Mar. 6, 2013, from corresponding French application.

* cited by examiner

*Primary Examiner* — Nghia Doan
(74) *Attorney, Agent, or Firm* — Young & Thompson

(57) ABSTRACT

A device (20) for charging a portable element (10) having a receiving antenna (Ar) for charging by induction, the charging device (20) includes: a charging surface (Sc); a plurality of emitting antennas (A1, A3); a layer of ferromagnetic material (30) placed beneath the plurality of emitting antennas (A1, A3); an electronic circuit; a plurality of resonators (R1, R2 ... Ri): having a resonance frequency substantially equal to the emission frequency of the antennas, placed between the plurality of antennas and the charging surface, and suitable, when they are activated, for reflecting the magnetic field (B) emitted by the antennas, and connected to the electronic circuit in order to be deactivated individually, according to a criterion of positioning of the receiving antenna relative to the resonators. An associated charging method is also described.

20 Claims, 4 Drawing Sheets

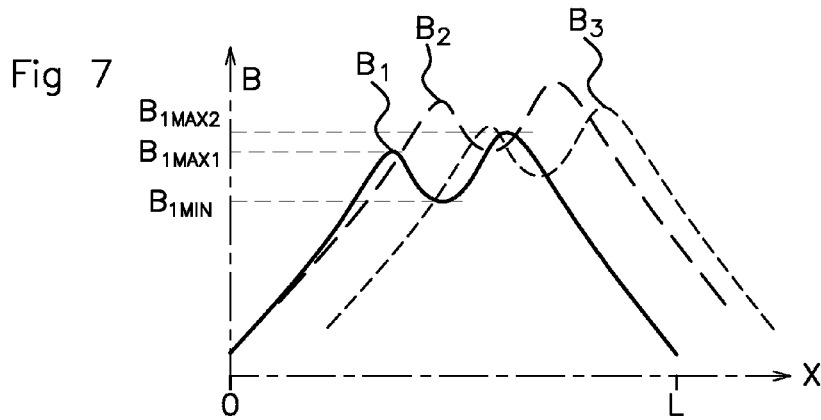
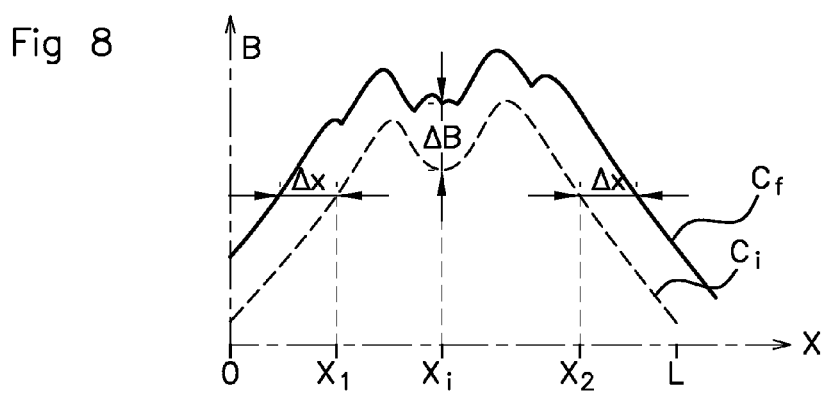
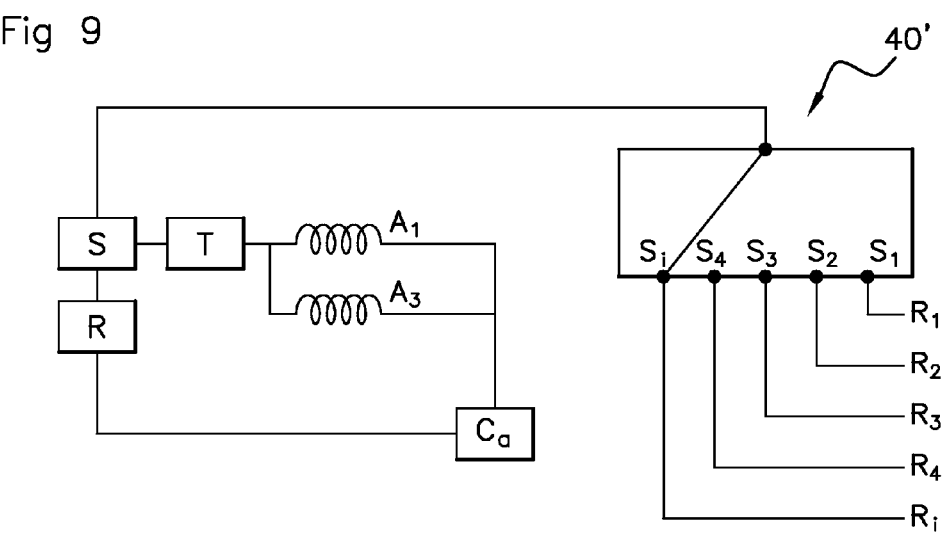

DEVICE FOR CHARGING A PORTABLE ELEMENT AND ASSOCIATED METHOD

FIELD OF THE INVENTION

The invention relates to a device for charging a portable element and an associated charging method. The invention relates more particularly to devices for charging by induction which comprise primary antennas, situated beneath a charging surface, emitting a magnetic field perpendicular to the current passing through them. This magnetic field is received by a secondary antenna included in a portable apparatus which is situated on the charging surface. The intensity of the magnetic field received is then converted by the portable apparatus into a current for charging said portable apparatus.

BACKGROUND OF THE INVENTION

Such charging devices are known to those skilled in the art. As illustrated in FIGS. 1 and 2, a charging device 20 usually comprises one or more primary antennas, called emitting antennas A1, A2, A3 situated beneath a charging surface Sc of the charging device 20. These emitting antennas A1, A2, A3 are connected to an electronic circuit (not shown in FIG. 1) which makes it possible to control the emission of each emitting antenna A1, A2, A3. A portable element 10, of the cell phone or other type, is placed on the charging surface Sc of the charging device 20 (cf. FIG. 2). This portable element 10 comprises a secondary antenna, called the receiving antenna Ar.

The operation of such a charging device is explained below. The electronic circuit detects the position of the receiving antenna Ar on the charging surface Sc, and instructs the emission of the emitting antenna(s) A1, A2, A3 of the charging device 20 which are the most aligned with the receiving antenna Ar. The detection of the position of the receiving antenna Ar is for example carried out by previously measuring a variation of voltage at the terminals of each emitting antenna A1, A2, A3. The emitting antenna(s) A1, A2, A3 which has (have) the greatest voltage variation is (are) substantially aligned with the receiving antenna Ar. One (or more) emitting antenna(s) A1, A2, A3 then emits (emit) a magnetic field B perpendicular to the current that passes through it (them), that is to say in the direction of the receiving antenna Ar. The magnetic field B is emitted at a determined frequency f which is the reception frequency of the receiving antenna Ar. The dimensions and structure of such charging devices 20 may be set by standards of the WPC (Wireless Power Consortium) type. According to this standard, for example the emission frequency of the emitting antennas A1, A2, A3 is between 100 kHz and 200 kHz.

In order to direct the magnetic field B preferably on the side on which the portable element 10 is situated, it is known practice to equip the charging device 20 with a resonant layer made of ferromagnetic material 30, also called ferrite 30, situated beneath the emitting antennas A1, A2, A3, that is to say on the side opposite to that on which the portable element 10 is situated. The magnetic field B is reflected by this ferrite 30 and is redirected mainly toward the portable element 10. The receiving antenna Ar receives this magnetic field B and the portable element 10 then converts the intensity of the magnetic field received by the receiving antenna Ar into a charging current. Charging stops when the portable element 10 sends an end-of-charging message to the charging device 20 in the form of a modulation of magnetic field which is received via the emitting antennas A1, A2, A3 and decoded by the electronic circuit.

In order to obtain a magnetic field B that is as uniform as possible on the charging surface Sc, it is known practice to place in the charging device 20 at least two superposed layers of emitting antennas A1, A2, A3 parallel to the charging surface Sc, the antennas situated on a top layer being offset relative to the antennas situated on a lower layer. As illustrated in FIG. 2, the emitting antenna A2 is situated above the emitting antennas A1 and A3 and it overlaps a portion of each of these emitting antennas A1, A3. However, the magnetic field B that is emitted (cf. FIG. 3) is not completely uniform over the charging surface Sc of the charging device 20 (cf. FIG. 2). The portable element 10 receives a magnetic field of different intensity depending on its position on the charging surface Sc. This is illustrated in FIG. 3 where the intensity of the magnetic field B is shown on a longitudinal axis X of the charging device 20. It emerges clearly from this FIG. 3 that the intensity of the magnetic field B is substantially uniform over a central portion of the charging surface Sc, between the positions x1 and x2, but that at the edges of the charging device 20, from the position 0 to the position x1 and from the position x2 to the position L, the intensity of the magnetic field B drops considerably. This is partly due to the dissipations of the magnetic field B at the edges of the charging device 20. Since the intensity of the magnetic field B is insufficient at these ends, charging of the portable element 10 is either impossible there or takes an abnormally long time.

This charging device 20 is known to those skilled in the art. The electronic circuit 40 incorporated into the charging device 20 which controls the emission of the magnetic field B is illustrated in FIG. 4. It comprises a control system S, of the microprocessor type, connected to a transmission unit T and to an array of three input switches Se1, Se2, Se3 (for example mechanical relays or transistors) each connected to an emitting antenna A1, A2, A3. Each emitting antenna A1, A2, A3 is also connected to an output switch Ss1, Ss2, Ss3 and then to at least one impedance-matching capacitor Ca and finally to a reception unit R, itself connected to the control system S.

The input switches Se1, Se2, Se3 are used to select the emitting antenna A1, A2, A3 emitting the magnetic field B in order to charge the portable element 10. The output switches Ss1, Ss2, Ss3 for their part are used to select an emitting antenna A1, A2, A3 to receive the messages originating from the portable element 10 such as an instantaneous charging rate or an end-of-charging message. Usually, it is the same emitting antenna A1, A2, A3 that receives the messages from the portable element 10 and that is selected to charge the latter. This emitting antenna A1, A2, A3, once selected, is then connected to an impedance-matching capacitor Ca, making it possible to adapt its emission frequency and hence that of the magnetic field B to that desired for the charge. For example, according to the example illustrated in FIG. 2, the emitting antenna A2 of the charging device 20 being ideally aligned with the receiving antenna Ar of the portable element 10, this emitting antenna A2 is selected for the transmission of the charge (emission of the magnetic field B) to the portable element 10 and for the reception of the messages originating from the latter. However, it is more frequent that no emitting antenna A1, A2, A3 of the charging device 20 is directly and ideally aligned with respect to the receiving antenna Ar of the portable element 10 and that it is necessary to select two adjacent emitting antennas A1, A2, A3 in order to charge the portable element 10 in an optimal manner (the shortest possible charging time).

A first drawback of this charging device 20 then appears. The use of two adjacent emitting antennas A1, A2, A3 to charge the portable element 10 creates a magnetic field B covering a charging surface area markedly greater than that theoretically necessary to charge the receiving antenna Ar. There is therefore a portion of magnetic field B emitted that is dissipated, unusable for the portable element 10 and hence wasted. This dissipation is added to that present at the edges [0, x1], [x2, L] of the charging device 20 (as explained above) thus creating an overconsumption of energy.

A second drawback of this charging device 20 lies in the use of an input switch Se1, Se2, Se3 and of an output switch Ss1, Ss2, Ss3 for each emitting antenna A1, A2, A3. These switches are traversed by high charging currents (>1 A) and are therefore relatively costly because they are adapted to support these high currents.

A third drawback lies in the use of several layers of emitting antennas A1, A2, A3 that are offset relative to one another, which adds a considerable extra cost to the charging device 20, each emitting antenna A1, A2, A3 being accompanied by its input switch, output switch, etc.

It is these drawbacks that the present invention proposes to alleviate.

SUMMARY OF THE INVENTION

The invention proposes a device for charging a portable element making it possible:

to considerably reduce the portion of the magnetic field B that is dissipated, and to reduce the cost of the charging device.

The invention proposes a device for charging a portable element comprising a receiving antenna for charging by induction, said charging device comprising:

a surface for charging the portable element, a plurality of emitting antennas having an emission frequency, placed beneath the charging surface and emitting a magnetic field, a layer of ferromagnetic material placed beneath the plurality of emitting antennas and having a surface at least substantially equal to the charging surface, an electronic circuit comprising a control system connected to the emitting antennas, the charging device also comprising a plurality of resonators:

having a resonance frequency substantially equal to the emission frequency, placed between the plurality of emitting antennas and the charging surface, and covering an active surface at least substantially equal to the charging surface, suitable, when they are activated, for reflecting the magnetic field in the direction of the emitting antennas, and connected to the electronic circuit by means of switches in order to be deactivated individually, according to a criterion of positioning of the receiving antenna relative to the resonators.

Thus the charging device according to the invention reduces the number of emitting antennas and eliminates the high-current, input and output switches of all the emitting antennas. Specifically, the charging device according to the invention comprises switches of the resonators, which are low-current switches and therefore not very costly.

Advantageously, the resonators are juxtaposed relative to one another, separated by a distance varying from 0 to e.

Preferably, the plurality of resonators is distributed evenly over the charging surface and/or symmetrically relative to the longitudinal axis and/or to the transverse axis bisecting the charging surface at its center.

Judiciously, the emitting antennas consist of a winding of copper wire having a minimum winding width, and the resonators are of rectangular shape, of which the longest side has a length at most equal to the minimum winding width. Or when the resonators are of circular shape, their external diameter is at most equal to the minimum winding width.

The charging device may comprise impedance-matching capacitors connected to the resonators.

In a first embodiment:

the charging device also comprises a multilayer printed circuit connected to the electronic circuit, and the emitting antennas and the resonators are printed in the form of windings of copper wire on two superposed layers of the printed circuit.

In a second embodiment, the charging device also comprises a second layer of ferromagnetic material situated between the layer of resonators and the charging surface.

The invention also relates to a method for charging a portable element via a charging device, the portable element comprising a receiving antenna for charging by induction and the charging device comprising:

a surface for charging the portable element, a plurality of emitting antennas having an emission frequency, placed beneath the surface for charging the portable element and emitting a magnetic field, a layer of ferromagnetic material placed beneath the plurality of emitting antennas and having a surface at least substantially equal to the charging surface;

an electronic circuit comprising a control system connected to the emitting antennas, the method comprising the following steps:

step 1: placement in the charging device of a plurality of resonators having a resonance frequency substantially equal to the emission frequency, placed between the plurality of emitting antennas and the charging surface, and covering an active surface at least substantially equal to the charging surface, and suitable, when they are activated, for reflecting the magnetic field toward the emitting antennas, and connected to the electronic circuit by means of switches in order to be deactivated individually, according to a criterion of positioning of the receiving antenna relative to the resonators.

step 2: placement of the portable element on the charging surface, step 3: detection by the electronic circuit of at least one resonator situated beneath the receiving antenna of the portable element, step 4: deactivation by the control system of the resonator thus detected in step 3.

More particularly, in step 4, the deactivation is obtained by switching on the resonator.

Preferably, step 3 comprises:

step 3a: a measurement of a voltage variation and/or of a voltage value and/or of a measurement of phase shift of the magnetic field at the terminals of each resonator, and step 3b: a detection by the electronic circuit of at least one resonator associated with values of voltage variation, and/or of voltage and/or of phase shift that are representative of a maximum magnetic coupling between the receiving antenna and the resonator.

Advantageously, step 3 comprises the detection of at least two resonators situated beneath the receiving antenna of the portable element and step 4 consists in the deactivation of the two resonators thus detected.

The invention also applies to any motor vehicle fitted with a charging device according to the features listed above.

BRIEF DESCRIPTION OF THE DRAWINGS

Other objects, features and advantages of the invention will become evident on reading the following description and on examining the appended drawings in which:

FIG. 7 represents, according to the invention, the intensity of the magnetic field B on the charging surface Sc in each of the positions P1, P2, P3 shown in FIG. 6, FIG. 8 represents the intensity of the magnetic field B on the charging surface Sc, along the longitudinal axis X, obtained with the charging device of the invention (curve Cf) and compared with that obtained with the charging device of the prior art (curve Ci), FIG. 9 represents the electronic circuit 40' of the charging device 20 according to the invention.

DETAILED DESCRIPTION OF THE INVENTION

Figure 1:
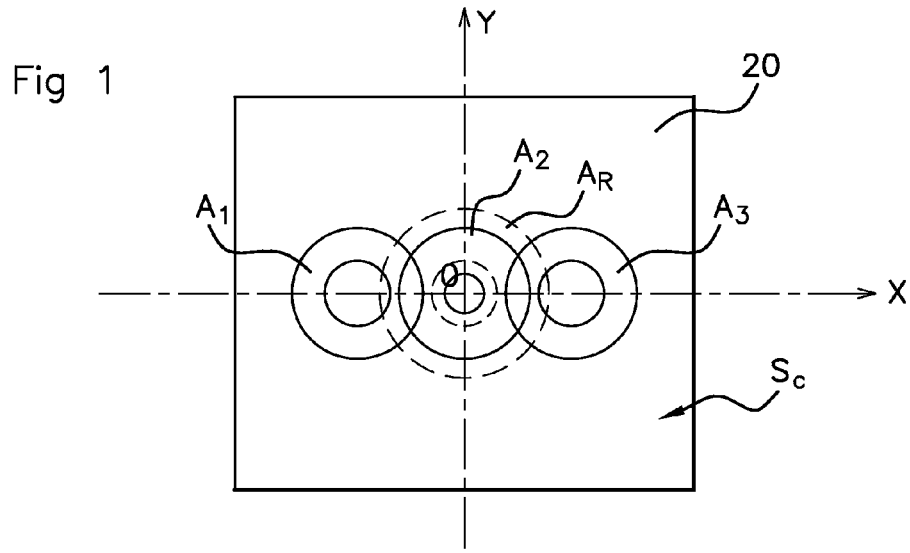
FIG. 1, previously explained, represents a view from above of a charging device 20 of the prior art, FIG. 2, previously explained, represents a view in section along the longitudinal axis X of the charging device 20 illustrated in FIG. 1, FIG. 3, previously explained, represents the intensity of the magnetic field B on the charging device Sc, along the longitudinal axis X of the charging device 20 of FIG. 2, FIG. 4, previously explained, represents the electronic circuit 40 of the charging device 20 according to the prior art.
Figure 2:
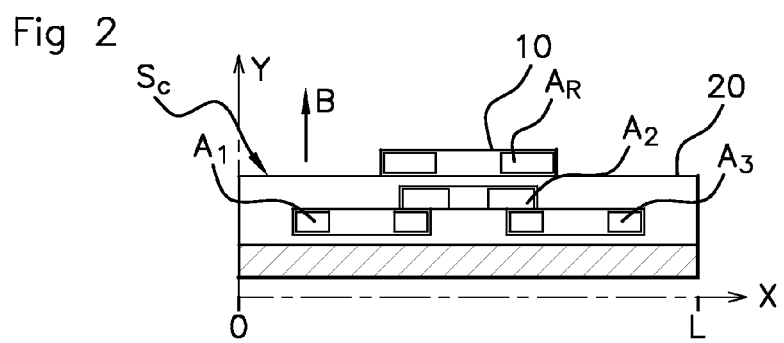
Figure 3:
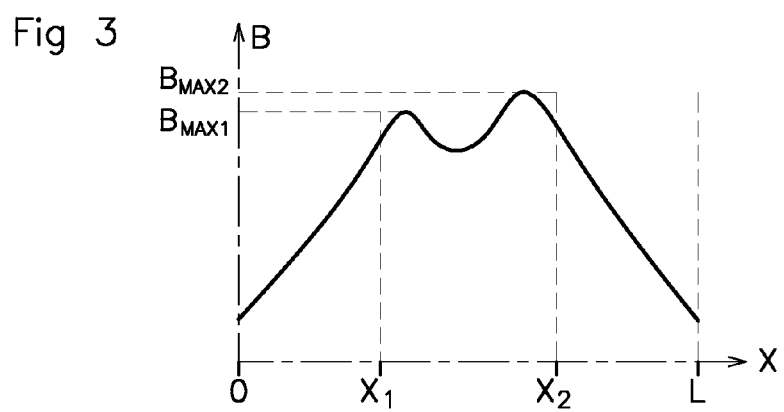
Figure 4:
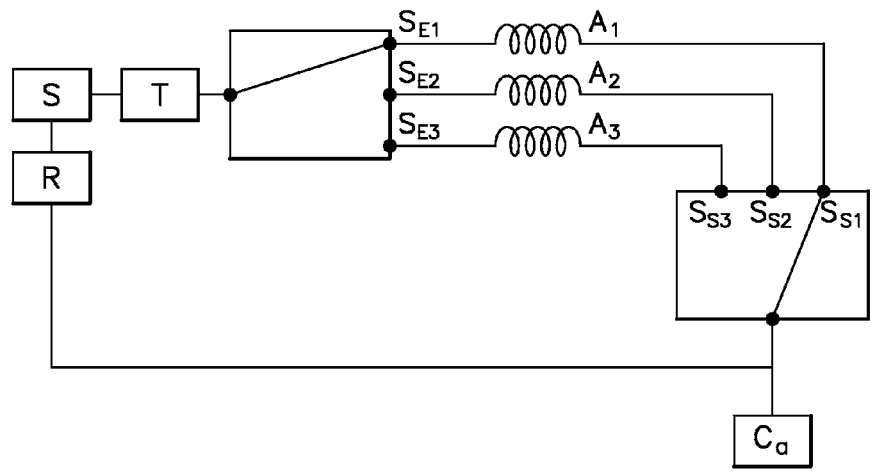
Figure 5:
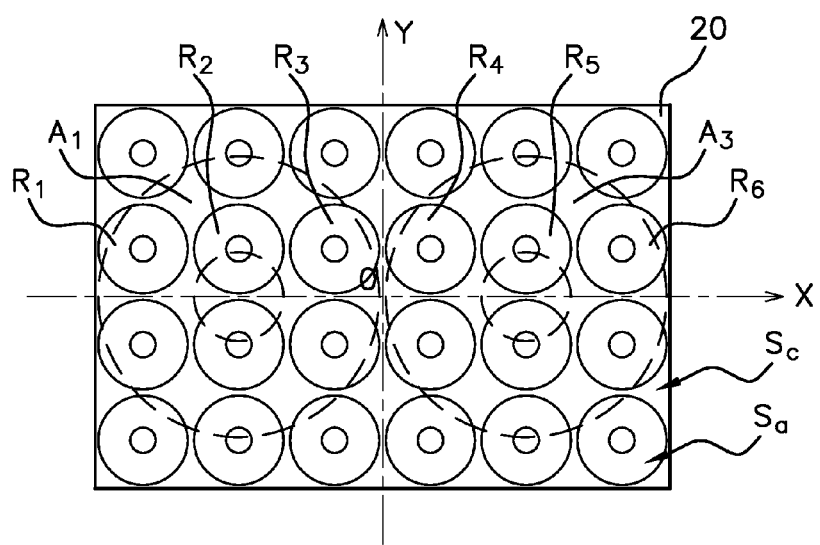
FIG. 5 represents a view from above of the charging device 20 according to the invention.
Figure 6:
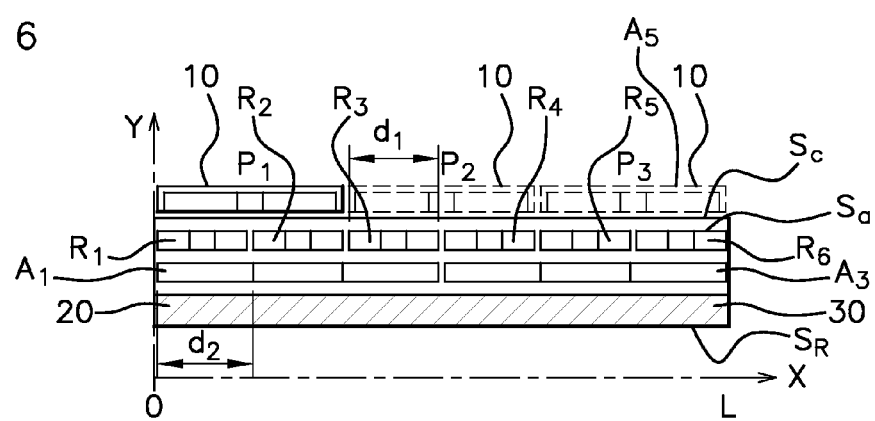
FIG. 6 represents a view in section, along the longitudinal axis X of the charging device 20 illustrated in FIG. 5, onto which a portable element 10 is placed in three different positions P1, P2, P3 on the charging surface Sc.

As illustrated in FIGS. 5 and 6, the device 20 for charging a portable element 10 comprising a receiving antenna Ar comprises according to the invention:
- a surface Sc for charging the portable element 10,
- a plurality of emitting antennas A1, A3 having an emission frequency f, placed beneath the charging surface Sc and emitting a magnetic field B;
- a layer of ferromagnetic material 30 placed beneath the plurality of emitting antennas A1, A3 and having a surface Sr at least substantially equal to the charging surface Sc, defined by the size and the position of the emitting antennas A1, A3, and
- an electronic circuit 40' (see FIG. 9) comprising a control system S connected to the emitting antennas A1, A3.

The invention also proposes to fit the charging device 20 with a plurality of resonators R1, R2, R3, . . . Ri placed beneath the charging surface Sc and above the emitting antennas A1, A3. "Resonators R1, R2, R3, . . . Ri" in this instance means any ferromagnetic element which, when it is activated, reflects at a given frequency, called the resonance frequency fr, a magnetic field that it receives. In the example below, which is nonlimiting, the resonators R1, R2, R3, . . . Ri, when they are activated, consist of windings of copper wire, not supplied with current, having a resonance frequency fr that is substantially equal to the emission frequency f of the emitting antennas A1, A3. They reflect the magnetic field B emitted by the emitting antennas A1, A3 on the side opposite to that on which the portable element 10 is situated. For this, the number of windings of copper wire of each resonator R1, R2, R3, . . . Ri is predetermined in order to modify their impedance as a function of the desired resonance frequency fr, or alternatively each resonator R1, R2, R3, . . . Ri is connected to an impedance-matching capacitor (not shown) making it possible to fix the resonance frequency fr at the emission frequency f of the emitting antennas A1, A3.

According to the invention, and as illustrated in FIG. 5, the plurality of resonators R1, R2, R3, . . . Ri covers an active surface Sa at least substantially equal to the charging surface Sc. Preferably, the resonators R1, R2 . . . Ri are juxtaposed relative to one another, separated by a distance e or with no free space between them.

Each resonator R1, R2, R3, . . . Ri is connected to a switch S1, S2 . . . Si, itself connected to the control system S (cf. FIG. 9). Thus, each resonator R1, R2, R3, . . . Ri can be individually deactivated, that is to say switched on, by closing the switch S1, S2 . . . Si that is associated therewith and that connects it to the control system S. The resonator R1, R2, R3, . . . Ri, when it is connected to the control system S, is then traversed by a current with an intensity that is relatively low but sufficient to disrupt its resonance frequency fr and deactivate it. The resonator R1, R2, R3, . . . Ri thus deactivated no longer reflects the magnetic field B that it receives from the emitting antennas and no longer forms an obstacle to the passage of the magnetic field B. The latter then traverses the deactivated resonator R1, R2 . . . Ri and is propagated freely in the direction of the portable element 10.

The invention proposes to deactivate at least one resonator R1, R2, R3, . . . Ri that is beneath the receiving antenna Ar of the portable element 10. Thus, since the adjacent resonators remain activated, that is to say resonating, the only possible passage for the magnetic field B emitted by the emitting antennas A1, A2, A3 toward the receiving antenna Ar of the portable element 10 is the passage left free by the deactivated resonator R1, R2 . . . Ri and of which the dimensions are substantially those of the deactivated resonator. Thus, the path of the magnetic field is canalized to the passage left free by the deactivated resonator, thus preventing the losses due to the edge effects.

Preferably, the invention proposes to deactivate two resonators R1, R2 . . . Ri in order to allow the magnetic field B to produce a loop (cf. FIG. 10), from the charging device 20 to the portable element 10 and then back to the charging device 20.

Figure 10:
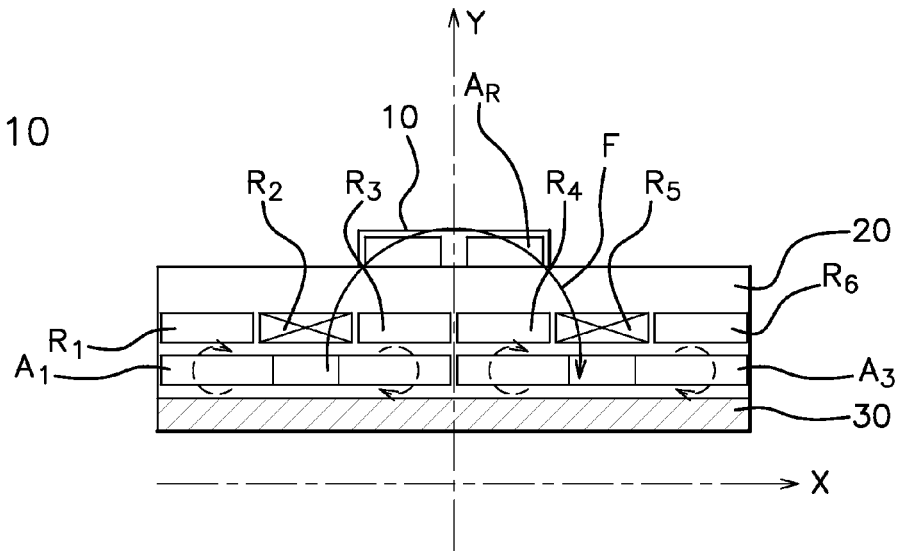
FIG. 10 represents the charging device 20 according to a first embodiment of the invention.

This is illustrated in FIG. 10. In FIG. 10, two resonators are deactivated, resonators R2 and R5 (marked with a cross in FIG. 10). In the example given, the current's flow direction in the antennas A1 and A3 are chosen arbitrarily in the same direction; they may also be in the opposite direction. The magnetic field B, emitted by the emitting antennas A1 and A3, is represented in the form of an arrow F; it forms a loop passing successively through the three antennas: the emitting antenna A1, the receiving antenna Ar and the emitting antenna A3. Since the adjacent resonators R1, R3, R4 and R6, situated on either side of the deactivated resonators R2 and R5, remain activated, the intensity of the magnetic field B that is emitted is concentrated on the two passages corresponding to the locations of the two deactivated resonators R2 and R5. Specifically, the passage of the magnetic field B being at these two locations of resonators (R2 and R5) greatly reduced relative to the passage of the prior art (which in this case was the surface corresponding to the two emitting antennas A1 and A3), the intensity of the magnetic field B passing through these two locations of resonators (R2, R5) is thereby amplified. This local concentration of the intensity of the magnetic field B makes it possible not only to improve the quality and/or the duration of charging of the portable element 10 by the charging device 20, but also to dispense with an additional layer of emitting antennas, in this instance in this example the emitting antenna A2. This will be explained below. Moreover, the presence of activated resonators R1, R3, R4, R6, juxtaposing the deactivated resonators R2, R5, considerably reduces the phenomenon of dissipation of magnetic field B outside the surface area covered by the portable element 10 on the receiving surface Sr and hence reduces the power losses. Specifically, these activated resonators block the emission of the magnetic field B on each side of the deactivated resonators.

According to the invention, it is important to affix the size and the position of the resonators R1, R2 ... Ri on the charging surface Sc in an appropriate manner so as to obtain an even and dense distribution of the passages of the magnetic field B thus amplified over the whole charging surface Sc. For this, initially and preferably, the plurality of resonators R1, R2 ... Ri is distributed evenly over the charging surface Sc and/or symmetrically relative to the longitudinal axis X and transverse axis Y bisecting the charging surface Sc at its center O (cf. FIG. 5).

Secondly, it is important that the size of the resonators R1, R2 ... Ri is smaller than that of the emitting antennas A1, A3 so as to reduce as much as possible the passage of the magnetic field B relative to that of the prior art in order to locally amplify the intensity of the latter.

For example, in the situation in which the emitting antennas A1, A2, A3 consist of a winding of copper wire of minimum winding width d2 (cf. FIG. 6), it is necessary that the resonators R1, R2 ... Ri, if they are of rectangular shape, have their longest side, of length d1, at most equal to the minimum winding width d2. If the resonators R1, R2 ... Ri are of circular shape, it is necessary that their external diameter d1 is at most equal to the minimum width d2 of the winding of copper wire of the emitting antennas A1, A3.

Thus, the passages of the magnetic field B created across the charging surface Sc of the charging device 20 are not only distributed evenly over the charging surface Sc but are also distributed densely, with at least two resonators R1, R2 ... Ri (that is to say at least two passages) that are associated for each emitting antenna A1, A3. Therefore, irrespective of the position of the portable element 10 on the charging surface Sc of the charging device 20, the latter can be charged optimally.

The even, dense and amplified distribution of the intensity of the magnetic field B over the charging surface Sc makes it possible to dispense with emitting antennas A1, A3, in this instance in our example the emitting antenna A2, which was situated above the emitting antennas A1 and A3 in the charging device 20 of the prior art.

This phenomenon is shown in FIGS. 6, 7 and 8. FIG. 6 shows the charging device 20 according to the invention on which a portable element 10 is placed in three different positions P1, P2, P3.

FIG. 7 shows the intensity of the magnetic field B that is emitted, along the longitudinal axis X of the charging device 20, in three positions P1, P2 and P3 of the portable element 10 on the charging surface Sc of FIG. 6.

It will be understood that, according to the invention:
if the portable element 10 is placed in the position P1 on the charging surface Sc of the charging device 20, the resonators R1 and R3 or R1 and R2 are deactivated,
if the portable element is in the position P2, the resonators R2 and R5 or R3 and R4 are deactivated,
if the portable element is in the position P3, the resonators R4 and R6, or R5 and R6 are deactivated.

For each position P1, P2, P3 of the portable element 10 on the charging surface Sc (and therefore for each pair of deactivated resonators), the intensity of the magnetic field B that is emitted (respectively B1, B2, B3 in FIG. 7) has two local maxima, positioned in the locations of the resonators R1, R2 ... Ri that are respectively deactivated. For example, for the position P1, the curve B1 of magnetic field intensity has two local maxima $B_{1MAX1}$ and $B_{1MAX2}$ separated by a minimum $B_{1MIN}$. The position of these local maxima and minima therefore changes depending on the position of the resonators R1, R2 ... Ri that are deactivated and therefore depending on the position of the portable element 10 on the charging surface Sc.

FIG. 8 shows the final curve Cf of the intensity of the magnetic field B available on the charging surface Sc, according to the invention (that is to say all the positions P1, P2, P3 without distinction), in comparison with that which was available according to the prior art, shown by the curve Ci. It can be seen that the invention makes it possible not only for a given position xi of the portable element 10 on the longitudinal axis X of the charging surface Sc to obtain an intensity of field B greater by ΔB than that of the prior art, but the invention also makes it possible to very markedly increase the intensity of the magnetic field at the edges [0, x1] and [x2, L] of the charging surface Sc where, according to the prior art, the intensity of the magnetic field was weak and did not allow an optimal charge (because in this instance the magnetic field B was greatly dissipated therein). This increase in the intensity of the magnetic field B at the edges of the charging device 20 is equivalent to an enlargement by Δx of the charging surface Sc relative to that of the prior art, which is effectively available for charging the portable element 10.

It should be noted that the curve of intensity of magnetic field Cf has been obtained with the charging device 20 illustrated in FIG. 6, that is to say with only two emitting antennas A1, A3 and not three emitting antennas (A1, A2, A3) as is the case for the curve Ci representing the intensity of the magnetic field B of the prior art.

Specifically, by means of the combination of the activated and deactivated resonators, the magnetic field B is emitted and amplified only where necessary, that is to say beneath the receiving antenna Ar of the portable element 10. The even and dense distribution over the charging surface Sc of the resonators R1, R2 ... Ri (that is to say of the passages of the amplified magnetic field B) makes it possible to charge the portable element 10 optimally irrespective of its position on the charging surface Sc and therefore makes it possible to dispense with an additional layer of emitting antennas (A2). The addition of the resonators therefore makes it possible to dispense with an antenna.

Naturally, it is important to note that the uniformity and the intensity of the magnetic field B on the charging surface Sc are dependent on the arrangement and the dimensions of the layer of ferromagnetic material 30 placed beneath the plurality of emitting antennas A1, A3 which reflects the magnetic field B in the direction of the portable element 10. Therefore, for a given charging surface Sc, determined by the position and the size of the emitting antennas A1, A3, it is important that the surface Sr of the layer of ferromagnetic material 30 be at least substantially equal to the charging surface Sc. Since the active surface Sa of the plurality of resonators R1, R2 ... Ri is also at least substantially equal to the charging surface Sc, the intensity of the magnetic field B thus obtained is substantially uniform irrespective of the position of the portable element 10 on the charging surface Sc.

Specifically, if the surface Sr of the layer of ferromagnetic material 30 or the active surface Sa of the resonators has smaller dimensions than the charging surface Sc, then the phenomenon of dissipation of the magnetic field at the edges of the charging surface Sc is increased. Conversely, if the surface Sr or the active surface Sa has dimensions greater than the charging surface Sc, then the intensity of the magnetic field B is insufficient at the edges of the charging surface Sc to optimally charge the portable element 10.

FIG. 9 illustrates the electronic circuit 40' of the charging device according to the invention.

The electronic circuit 40' comprises a control system S connected to a transmission unit T and then to two emitting antennas A1 and A3 in parallel, each connected to one and the same impedance-matching capacitor Ca, then to a receiving unit R, itself connected to the control system S. Compared with the electronic circuit 40 of the charging device 20 of the prior art, there are no longer input switches Se1, Se2, Se3 or output switches Ss1, Ss2, Ss3 and the emitting antennas A1 and A3 are permanently connected to the control system S, that is to say that they emit and receive simultaneously and not selectively as was the case before. The control system S is also connected to a multiplexer or an array of switches S1, S2 . . . Si, each connected to a resonator R1, R2 . . . Ri. These switches S1, S2 . . . Si are traversed by low currents and are therefore not very costly. Therefore all of the emitting antennas permanently emit a magnetic field and the deactivation of the appropriate resonators makes it possible to guide this magnetic field preferably towards the receiving antenna Ar of the portable element 10.

The charging method according to the invention comprises the following steps:
- step 1: placement in the charging device 20 of a plurality of resonators R1, R2 . . . Ri:
  - having a resonance frequency fr equal to the emission frequency f of the emitting antennas A1, A3,
  - placed above said antennas and beneath the charging surface Sc and,
  - covering an active surface Sa at least substantially equal to the charging surface Sc, suitable, when they are activated, for reflecting the magnetic field B emitted by the emitting antennas, and
  - connected to the control system by means of switches S1, S3 . . . Si, in order to be deactivated according to a criterion of positioning of the receiving antenna Ar relative to the resonators R1, R2 . . . Ri,
- step 2: placement of the portable element 10 on the charging surface Sc,
- step 3: detection by the electronic circuit 40 of at least one resonator R1, R2 . . . Ri situated beneath the receiving antenna Ar of the portable element 10,
- step 4: deactivation by the control system S of the resonator R1, R2 . . . Ri thus detected in step 3.

As explained above, "deactivation of the resonator" means switching it on, for example by connecting it to a switch which can put this resonator in open loop or in closed loop. "resonator situated beneath the receiving antenna Ar" means either the resonator R1, R2 . . . Ri that is situated physically beneath the receiving antenna Ar, or, preferably, the resonator R1, R2 . . . Ri that has a maximum magnetic coupling with the receiving antenna Ar thus making sure of maximum charge efficiency. Therefore, the criterion of positioning of the receiving antenna Ar relative to the resonators R1, R2 . . . R is either a criterion of physical positioning or a criterion of magnetic coupling B in order to optimize the transfer of the magnetic field B from the charging device 20 to the portable element 10. For this purpose, the method also proposes that the step 3 comprises the following steps:
- step 3a: measurement of the variation of the voltage and/or of the value of the voltage and/or of the phase shift of the magnetic field at the terminals of each resonator R1, R2 . . . Ri, and
- step 3b: detection by the electronic circuit 40 of at least one resonator R1, R2 . . . Ri associated with values of voltage variation, and/or of value of voltage and/or of phase shift that are representative of a maximum magnetic coupling between the resonator R1, R2 . . . Ri and the receiving antenna Ar.

Preferably, step 3 comprises the detection of at least two resonators R1, R2 . . . Ri situated beneath the receiving antenna Ar (cf. FIG. 10), that is to say having a maximum magnetic coupling with the latter and step 4 consists in the deactivation of the two resonators thus detected.

Specifically, as explained above, the deactivation, for example, of two resonators R2, R5 allows the magnetic field B to make a loop from the charging device 20 to the portable element 10 to be charged and then back to the charging device 20, markedly improving the charge efficiency.

The invention therefore makes it possible to reduce the cost of the charging device 20:
- by dispensing with an additional layer of emitting antennas (A2), and
- by dispensing with all the high current switches Se1 . . . Se3, Ss1 . . . Ss3, and
- by replacing them with an array of resonators R1, R2 . . . Ri and associated switches S1, S2 . . . Si, that are of low current and therefore low cost.

Moreover, as explained above, the invention makes it possible to enlarge the charging surface Sc of the charging device 20 and to improve the quality and/or the efficacy of the charge by locally amplifying, exclusively beneath the receiving antenna Ar of the portable element 10, the intensity of the magnetic field B.

In a particular embodiment, the charging device 20 comprises a multi-layer printed circuit (not shown) connected to the electronic circuit 40', and the resonators R1, R2 . . . Ri and the emitting antennas A1, A3 are printed in the form of copper wire on two superposed layers of said printed circuit.

Figure 11:
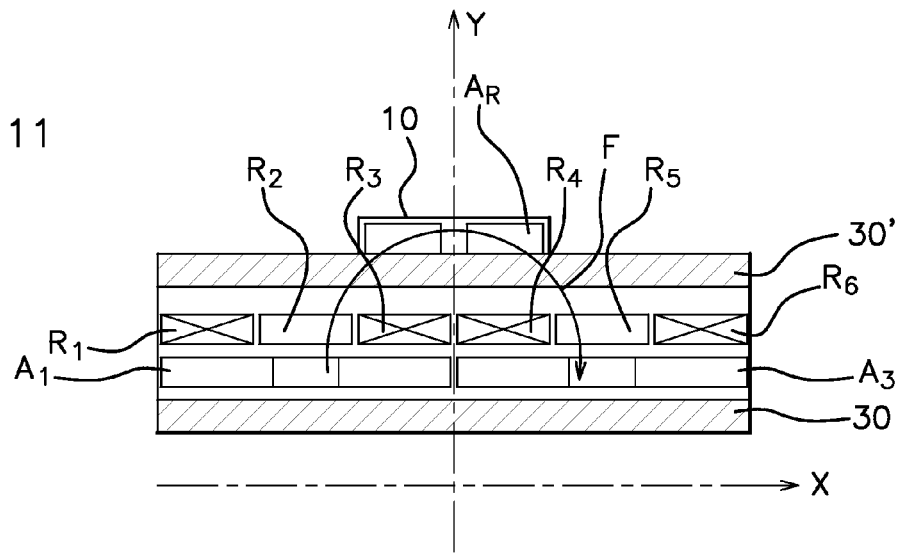
FIG. 11 represents the charging device 20 according to a second embodiment of the invention.

In a second embodiment, the charging device 20 also comprises a second layer of ferromagnetic material 30' (cf. FIG. 11), or second ferrite 30', resonating at the frequency f of emission of the emitting antennas A1, A3, and situated above the layer of resonators R1, R2 . . . Ri.

The operation of the resonators of this second embodiment is then inverted. More particularly, when a resonator R1, R2 . . . Ri is deactivated, the second ferrite 30' reflects the magnetic field B originating from the emitting antennas A1, A3 in the direction of the opposite side where it is. When a resonator R1, R2 . . . Ri is activated (that is to say that it reflects the magnetic field B), the second ferrite 30' situated above is magnetically saturated and allows the magnetic field B to pass in the direction of the portable element 10. In this second embodiment, all the resonators R1, R2 . . . Ri are initially deactivated (switched on), then when the position of a portable element 10 is detected on the charging surface Sc the resonator(s) R1, R2 . . . Ri situated the receiving antenna Ar of the portable element 10 or having the best magnetic coupling with the latter is (are) then activated (switched off).

Naturally, the invention is not limited to the embodiment described, given only as a nonlimiting example.

The invention claimed is:

1. A device for charging a portable element including a receiving antenna for charging by induction, said charging device comprising:
   - a surface for charging the portable element;
   - a plurality of emitting antennas having an emission frequency, placed beneath the charging surface and emitting a magnetic field;
   - a layer of ferromagnetic material placed beneath the plurality of emitting antennas and having a surface at least substantially equal to the charging surface;
   - an electronic circuit comprising a control system connected to the emitting antennas; and a plurality of resonators:
- having a resonance frequency substantially equal to the emission frequency,
- placed between the plurality of emitting antennas and the charging surface, and
- covering an active surface at least substantially equal to the charging surface, configured, when the emitting antennas are activated, to reflect the magnetic field in the direction of the emitting antennas, and
- connected to the electronic circuit by switches in order to be deactivated individually, according to a criterion of positioning of the receiving antenna relative to the resonators.

2. The device as claimed in claim 1, wherein the resonators are juxtaposed relative to one another.

3. The device as claimed in claim 1, wherein the charging surface has a transverse axis and a longitudinal axis bisecting the transverse axis at its center, and
the plurality of resonators is distributed evenly over the charging surface and/or symmetrically relative to the longitudinal axis and/or to the transverse axis.

4. The device as claimed in claim 1, wherein the emitting antennas consist of a winding of copper wire having a minimum winding width, and
the resonators are of rectangular shape, of which the longest side has a length at most equal to the minimum width.

5. The device as claimed in claim 1, wherein the emitting antennas consist of a winding of copper wire having a minimum winding width, and
the resonators are of circular shape, having an external diameter at most equal to the minimum width.

6. The device as claimed in claim 1, further comprising impedance-matching capacitors connected to the resonators.

7. The device as claimed in claim 1, further comprising a multilayer printed circuit connected to the electronic circuit, wherein the emitting antennas and the resonators are printed in the form of windings of copper wire on two superposed layers of the printed circuit.

8. The device as claimed in claim 7, further comprising a second layer of ferromagnetic material situated between the layer of resonators and the charging surface.

9. A method for charging a portable element using a charging device comprising
- a surface for charging the portable element,
- a plurality of emitting antennas having an emission frequency, placed beneath the charging surface and emitting a magnetic field,
- a layer of ferromagnetic material placed beneath the plurality of emitting antennas and having a surface at least substantially equal to the charging surface,
- an electronic circuit comprising a control system connected to the emitting antennas, and
- a plurality of resonators:
  - having a resonance frequency substantially equal to the emission frequency,
  - placed between the plurality of emitting antennas and the charging surface,
  - covering an active surface at least substantially equal to the charging surface, configured, when the emitting antennas are activated, to reflect the magnetic field in the direction of the emitting antennas, and
  - connected to the electronic circuit by switches in order to be deactivated individually, according to a criterion of positioning of the receiving antenna relative to the resonators, the method comprising:
- placing the portable element on the charging surface;
- detecting, by the electronic circuit, at least one resonator situated beneath the receiving antenna of the portable element, according to the criterion of positioning of the receiving antenna relative to the resonators;
- deactivating, by the control system, the resonator thus detected; and
- charging the portable element.

10. The method as claimed in claim 9, wherein the deactivating comprises switching on the resonator.

11. The method as claimed in claim 9, wherein the detecting comprises:
- measuring a voltage variation and/or a voltage value and/or a measurement of phase shift of the magnetic field at the terminals of each resonator, and
- detecting, by the electronic circuit, at least one resonator associated with values of voltage variation, and/or of voltage and/or of phase shift that are representative of a maximum magnetic coupling between the receiving antenna and the resonator.

12. The method as claimed in claim 9, wherein the detecting comprises detecting at least two resonators situated beneath the receiving antenna of the portable element, and
the deactivating consists in deactivating the two resonators thus detected.

13. The device as claimed in claim 2, wherein the charging surface has a transverse axis and a longitudinal axis bisecting the transverse axis at its center, and
the plurality of resonators is distributed evenly over the charging surface and/or symmetrically relative to the longitudinal axis and/or to the transverse axis.

14. The device as claimed in claim 2, wherein the emitting antennas consist of a winding of copper wire having a minimum winding width, and
the resonators are of rectangular shape, of which the longest side has a length at most equal to the minimum width.

15. The device as claimed in claim 2, wherein the emitting antennas consist of a winding of copper wire having a minimum winding width, and
the resonators are of circular shape, having an external diameter at most equal to the minimum width.

16. The device as claimed in claim 2, further comprising impedance-matching capacitors connected to the resonators.

17. The device as claimed in claim 2, further comprising a multilayer printed circuit connected to the electronic circuit, wherein the emitting antennas and the resonators are printed in the form of windings of copper wire on two superposed layers of the printed circuit.

18. The method as claimed in claim 10, wherein the detecting comprises:
- measuring a voltage variation and/or a voltage value and/or a measurement of phase shift of the magnetic field at the terminals of each resonator, and
- detecting, by the electronic circuit, at least one resonator associated with values of voltage variation, and/or of voltage and/or of phase shift that are representative of a maximum magnetic coupling between the receiving antenna and the resonator.

19. The method as claimed in claim 10, wherein the detecting comprises detecting at least two resonators situated beneath the receiving antenna of the portable element, and
the deactivating consists in deactivating the two resonators thus detected.

20. The method as claimed in claim 11, wherein the detecting comprises detecting at least two resonators situated beneath the receiving antenna of the portable element, and
the deactivating consists in deactivating the two resonators thus detected.

* * * * *